April 3, 1962 W. KITTEL 3,028,151
DEVICE FOR THE SINGLE OR REPEATED MIXING AND SUBSEQUENT
UNMIXING OF TWO MEDIA IN COUNTERCURRENT
Filed Jan. 14, 1960 7 Sheets-Sheet 1

INVENTOR
WALTER KITTEL

April 3, 1962 W. KITTEL 3,028,151
DEVICE FOR THE SINGLE OR REPEATED MIXING AND SUBSEQUENT
UNMIXING OF TWO MEDIA IN COUNTERCURRENT
Filed Jan. 14, 1960 7 Sheets-Sheet 2

Fig.7

INVENTOR
WALTER KITTEL

INVENTOR
WALTER KITTEL

INVENTOR
WALTER KITTEL

United States Patent Office 3,028,151
Patented Apr. 3, 1962

3,028,151
DEVICE FOR THE SINGLE OR REPEATED MIXING AND SUBSEQUENT UNMIXING OF TWO MEDIA IN COUNTERCURRENT
Walter Kittel, Gartengasse 12, Gmunden, Austria
Filed Jan. 14, 1960, Ser. No. 2,452
Claims priority, application Austria May 31, 1954
18 Claims. (Cl. 261—155)

This application is a continuation-in-part of my application Serial No. 511,297, filed May 26, 1955, and now abandoned in favor of this application.

This invention relates to countercurrent contacting columns generally used for repeatedly mixing and then unmixing two media, such as a liquid and gas, and used mainly for rectification, distillation, washing, cooling or absorption of gases and the like.

It is known to be advantageous to produce a rotational flow of the liquid in contacting columns in order to improve the mixing of the gas and the liquid. Such rotational flow not only makes it possible to enhance the desired intimate contact and provide a steady renewal of the surfaces of the two media, but also provides a stabilization of the flow condition and, therefore, may obviate the need for complicated costly equipment in the columns, such as the so-called bubble plates still often used at present. Rotational flow, therefore, may permit much simpler and cheaper structures.

It has been found, however, that the advantages of providing rotational flow are always accompanied by the basic disadvantage that there is a considerable dependence on the load, that is, a certain minimum load is necessary to produce the desired rotational effect. Attempts to take this difficulty into account by correspondingly dimensioning the exchange surfaces and the plate diameter entail a reduction of throughput capacity of the plates and of the apparatus containing them, because the path of one medium is obstructed by the other.

In contrast to all previous arrangements seeking to overcome this difficulty by the use of complicated constructions, the present invention avoids the disadvantage mentioned above by causing the mixing of the two media to take place along the surface of a hollow vertical cylinder which is perforated with a large number of small apertures oriented in a tangential direction.

The objects of the present invention are obtained by placing a vertical cylindrical column in a vertical housing with the walls of the hollow cylinder spaced from the wall of the housing. A plurality of first partitions are placed between the hollow cylinder and the wall at different levels to provide a plurality of outer separated zones, and a plurality of vertically spaced second partitions are arranged within the cylinder and arranged at levels between the levels of the first partitions. The liquid can pass from an outer zone to an inner zone and from an inner zone to an outer zone only by passing through the cylindrical wall and this is also true of the lighter fluid or gas. As the gas passes through the tangential perforations in the cylinder wall it contacts the liquid on the far side of the cylinder wall and imparts a rotation to the liquid. The perforations or slots of the cylinder wall in one case, called Class I, are in the same tangential direction in all zones, whereas in the second case, called hereafter Class II, the tangential direction of the slots change from zone to zone. Since the ascending medium or gas passing through the slots has imparted thereto an approximately tangential direction and due to its kinetic energy imparts rotational movement to the descending heavier medium, and since at one time the movement of the lighter medium is from the outside toward the inside, and at another time from the inside toward the outside it will cause a rotational movement of the heavier medium in the opposite senses or directions in successive zones in Class I, that is, when all the slots are in the same tangential direction.

When, however, the slots in the different zones are oriented in different directions, a rotational movement of the heavier medium will result which is always in the same direction. Class I is mainly of interest when the ascending lighter medium possesses a large kinetic energy, while Class II is of main interest when the lighter medium possesses a small kinetic energy. Class I is useful when the kinetic energy of the ascending medium is sufficient to bring about the rotation of the descending medium despite the fact that the direction of rotation of the descending medium changes from zone to zone. Class I is mainly of practical interest when the ascending lighter medium is a gas or vapor and the heavier descending medium is a liquid.

Class II is mainly of interest when the kinetic energy of the ascending medium (which may here be a liquid) is not sufficient to bring about by itself the rotation of the descending medium, so that a continuous change of the sense of rotation from zone to zone would be unfavorable, and where provision must be made to use the kinetic energy of the descending medium to bring about a rotation thereof.

In the following description and the accompanying drawings various embodiments of both forms of the invention will be more fully disclosed, and other objects and advantages of the invention will become apparent.

Figure 1:
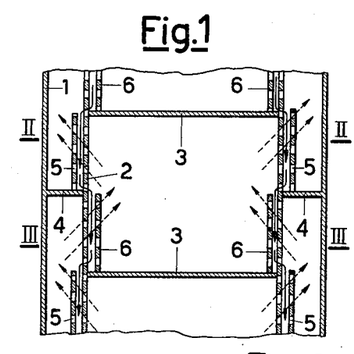
FIG. 1 is a partial sectional view of a contacting column constituting embodiment of the invention.
Figure 2:
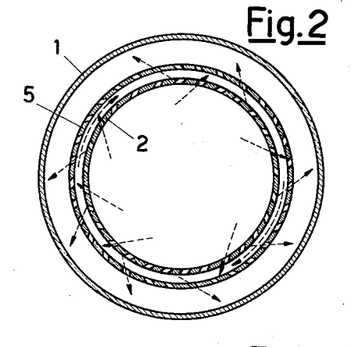
FIGS. 2 and 3 are sectional views taken along the lines A—A and B—B of FIG. 1.
Figure 3:
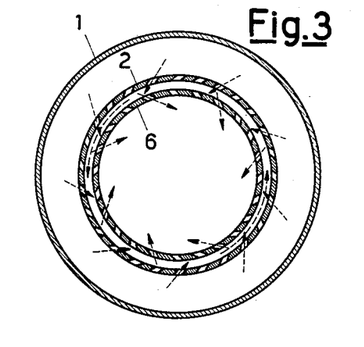

Referring to FIGS. 1 to 3 the exchange or contacting apparatus includes a hollow vertical cylindrical wall 1 only a portion of which is shown. Within the wall 1 there is a perforated cylindrical column or wall 2 having a large number of small tangential slots or perforations spaced between wall 1 and wall 2. The spaces within wall 2 are separated into a large number of zones by partitions 3 and 4 so that the only communication between an inner zone within the cylinder 2 and an outer zone between the cylinder 2 and the wall 1 is through the perforations of cylinder wall 2. Therefore, a lighter fluid ascending in the column must flow between the inner and outer zones along paths indicated by the dash arrows while a heavier descending medium must flow along the paths indicated by the solid arrows. Perforated spray plates 5 and 6 each consisting of a short cylinder may be placed on the partitions 3 and 4 for maintaining the heavier medium adjacent to the cylinder wall 2. Spray plates 5 and 6 may have perforations similar to those of cylinder wall 2.

As can be seen from FIGS. 1 to 3, the slots 2′ are oriented in the same tangential directions throughout the entire column and are, therefore, an example of Class I. The two media flowing through the column vertically in the countercurrent relationship with respect to each other are compelled to pass through the oblique apertures of cylinder wall 2 alternately from the outside to the inside and vice versa, and as a consequence of a more or less tangential passage to the cylinder they are given a vigorous rotation. This is particularly true when the rising lighter medium passes inwardly through the wall, because then the obstructing heavier medium is retained by centrifugal force at the inner surface of cylinder 2, descending therealong in helical lines. When the lighter medium flows outwardly the centrifugal force acts mainly to cause an intensive separation. Taking into account the different behaviour of the successive contact zones it may be desirable to make the two cross sections of flow of different sizes by selecting different diameters of the cylinder 2, and similarly it may be desirable to vary the distances between the partitions 3 and 4.

It may be noted that the construction shown in FIG. 1 has a number of advantages particularly over those using the conventional exchange plates. First, the structure of the invention insures the desired uniform wetting of an exchange surface with heavier medium, even with very small loads, because the heavier medium is not required to be carried on the exchange surface by the rising lighter medium. The consequences of this is that a considerable reduction of flow resistance is obtained, which is of decisive importance in numerous cases. Secondly, owing to the readily obtained unmixing of the two media in the zones where the lighter medium flows outwardly, the danger of the two media carrying each other along is much smaller and this provides a higher throughput capacity. Further it might be mentioned that the cost of installation of the equipment is very low due to its extreme simplicity. This advantage can be greatly increased by providing the apertures in cylinder 2 by forming the latter of a suitably profiled expanded metal. Such an expanded metal cylinder already has a large number of small slots which are tangentially oriented for excellently serving their desired purposes.

The cylinders 5 and 6 are useful particularly where it is desired to improve the unmixing or separating effect. Cylinders 5 and 6 are provided with passageways or perforations oriented in tangential directions opposed to the direction of the slots in cylinder wall 2, and, if desired, the apertures in cylinders 5 and 6 may be larger than those in cylinder wall 2.

Figure 4:
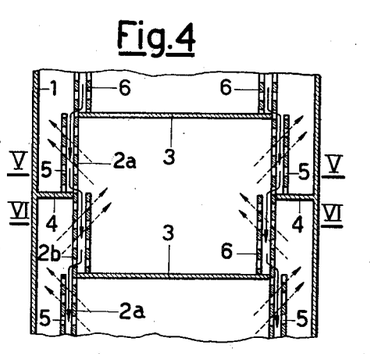
FIG. 4 is a partial sectional view of another embodiment of the invention.
Figure 5:
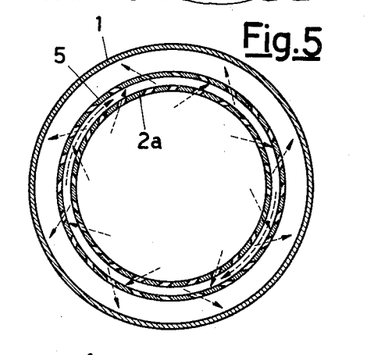
FIGS. 5 and 6 are sectional views taken along the lines A—A and B—B, respectively, of FIG. 4.
Figure 6:
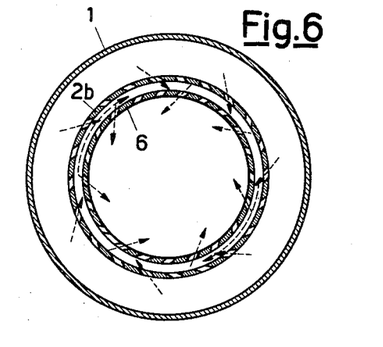

The column shown in FIGS. 4 to 6 is similar to that illustrated in FIGS. 1 to 3 except that the perforations or slots of the cylinder wall are oriented in opposite tangential directions in successive zones 2a and 2b. The embodiment of FIGS. 4 to 6 thus corresponds to Class II and provides for the circulation or rotation of the heavier medium in the same circumferential direction in all zones.

Figure 7:
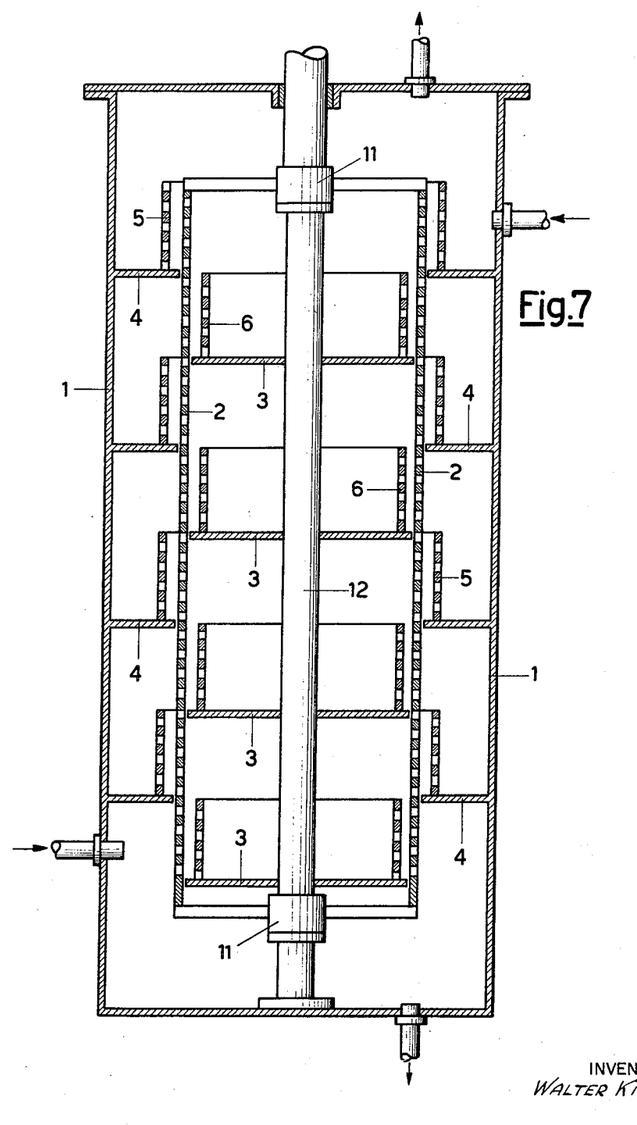
FIG. 7 is a sectional view of a contacting column constituting another embodiment of the invention.

In the case where the two counterflowing media have specific gravities which do not differ greatly and, therefore, the lighter medium possesses only little lifting force it may be desirable to rotate the exchange cylinder 2 by mounting it on a rotatable support 11 as shown in FIG. 7. The column is constructed substantially in the same manner as those shown in FIGS. 1 to 6, with the partitions 3 and 4 substantially separating the space inside and outside the cylinder 2 into a plurality of liquid tight zones. The partitions 3 and 4 and the cylinders 5 and 6 are stationary, the latter acting as stator blade rings. It is possible thereby to obtain particular good mixing of the two media. If desired, the rotatable shaft 12 may be externally driven so as to rotate cylinder 2.

Figure 8:
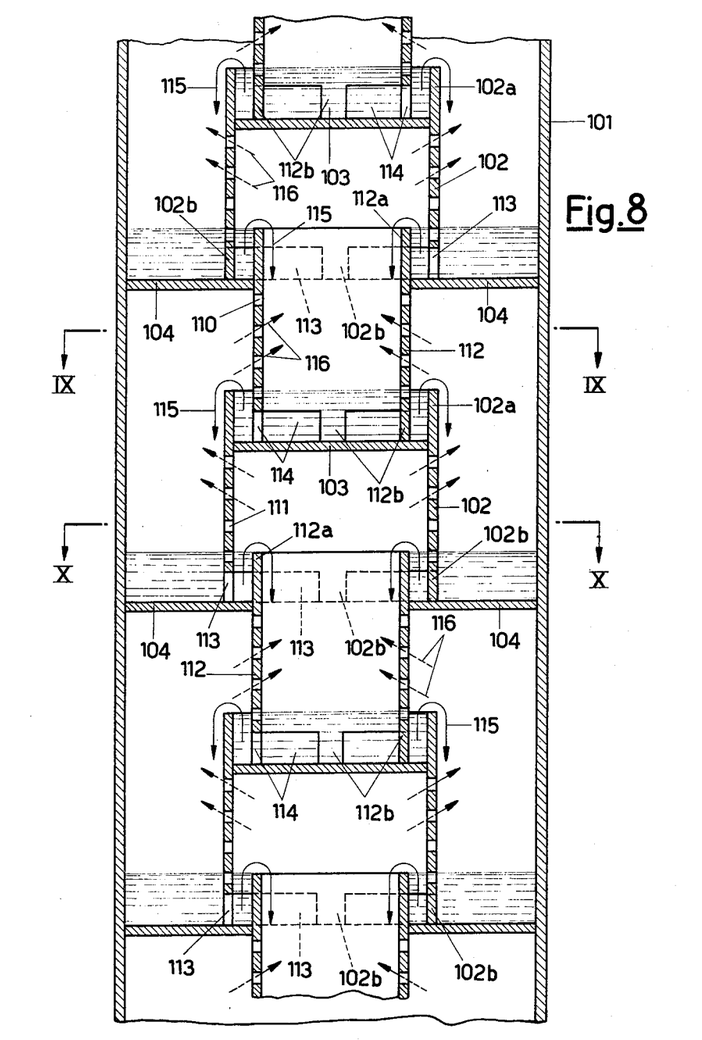
FIG. 8 is a partial sectional view of still another embodiment of the invention.
Figure 9:
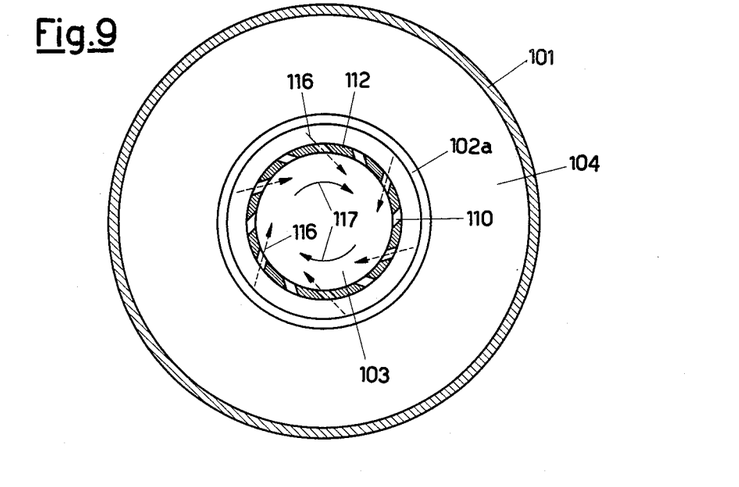
FIGS. 9 and 10 are sectional views taken along the lines 9—9 and 10—10 of FIG. 8.
Figure 10:
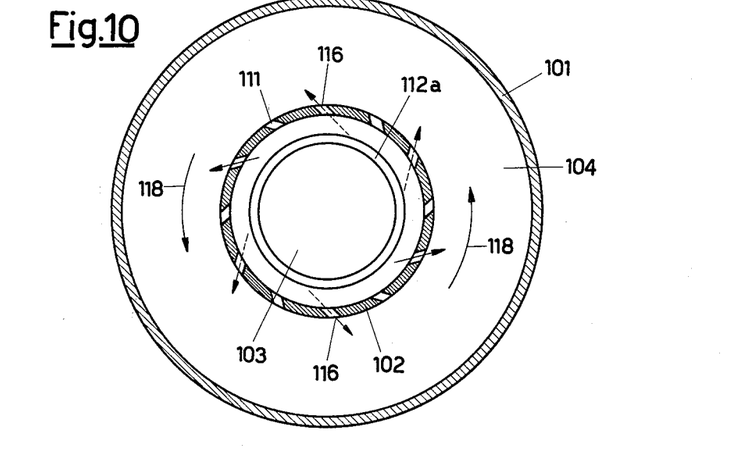
Figure 11:
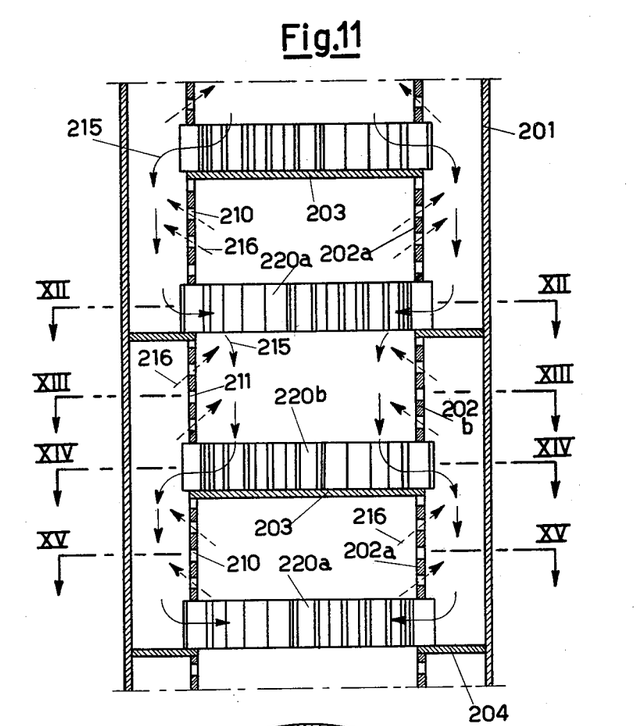
FIG. 11 is a partial longitudinal sectional view of still another embodiment of the invention.
Figure 12:
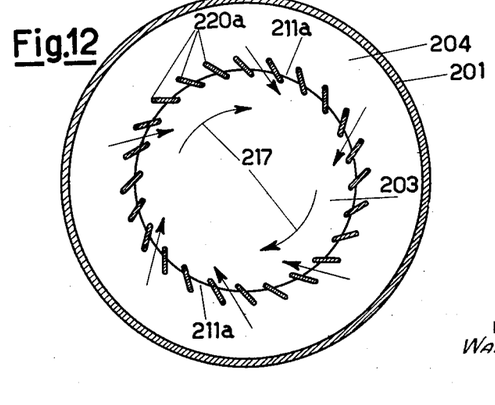
FIGS. 12 to 15 are sectional views taken along the lines 12—12, 13—13, 14—14 and 15—15 of FIG. 11.
Figures 13, 14, 15:
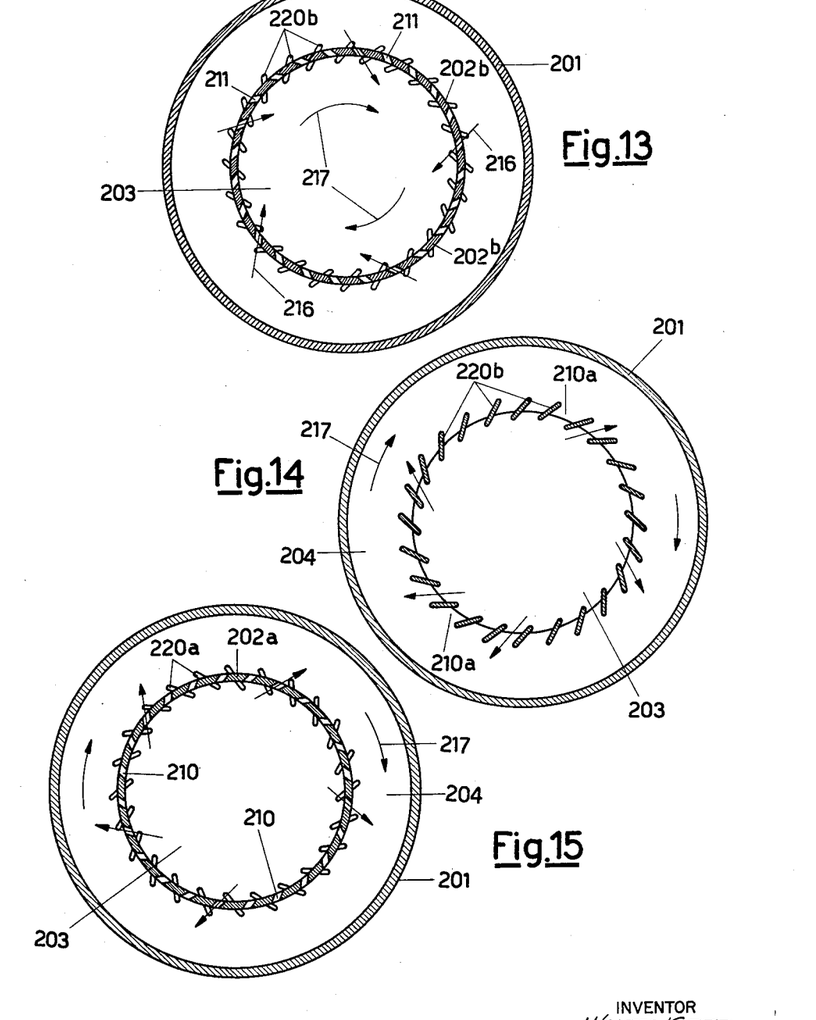

FIGS. 8 to 10 show embodiments of Class I in which the descending liquid (see arrows in full) and an ascending gas or vapor (arrows in dotted lines) are alternatingly brought in contact with each other and out of contact. The kinetic energy of the gas or vapor is large enough to bring about by itself the rotation of the liquid.

FIG. 8 shows the housing or shell 101 in which horizontal annular plates 104 and center plates 103 are arranged. Furthermore, vertical cylinders 102 having a larger diameter and cylinders 112 with smaller diameters are arranged alternately. These cylinders abut on the plates 104 and 103, respectively. The cylinders have an upper section 102a and 112a, respectively, without any slots or passages, a central section 102 and 112, respectively, with oblique or tangential slots 110 and 111, and a bottom section 102b and 112b, respectively, with larger openings 113 and 114, respectively. As shown the construction provides liquid seals for the descending liquid, that is to say the liquid collects on plates 103 and 104 which form trays with the upper sections 102a and 112a of the cylinders, respectively. The liquid can freely flow over the rims of the trays as shown by arrows 115. The large openings 113 and 114, respectively, in the bottom section of the cylinders practically do not cause any resistance to the flow of the liquid.

The ascending gases pass through the tangential slots 110 and 111 in the central sections 102 and 112 of the cylinders, alternate inwardly, as shown by arrows 116 of FIG. 9, and outwardly, as shown by arrows 116 in FIG. 10. The direction of the slots 110 and 111 in the cylinder sections 102 and 112 is the same so that the rotation of the liquid brought about by the passage of the gas changes the direction of rotation of the liquid from zone to zone as shown by arrows 117 and 118.

In the case of FIGS. 8 to 10, only the kinetic energy of the ascending gases and vapors, respectively, is used, which kinetic energy is comparatively high. In the zones in which the gases pass from the outside to the interior, the liquid inside wall 112 is rotated by the intimate contact with the gases, whereas in the zones in which the gases pass through the slots from the inside outward, the liquid outside wall 102 will be rotated and a separation action will result.

In FIGS. 11 to 15, there is shown an embodiment of Class II which is used when the kinetic energy of the ascending gaseous or liquid medium is low and not sufficient in itself to bring about the desired rotation. In this case, additional kinetic energy must be used, namely, that of the descending liquid.

In the housing or shell 201 of the column there are horizontal partitions 203 and 204 and vertical cylinder sections 202a and 202b are provided which have equal diameters. Between cylinder sections 202a and 202b there are circular arrangements of vanes 220a and 220b, respectively, located immediately above plates 203 and 204. The cylinder walls 202a and 202b are provided with oblique slots, with the slots 210 of cylinders 202a oriented in one direction and slots 211 of cylinders 202b oriented in the opposite direction. The vanes 220a and 220b are likewise obliquely oriented and have between them passages 210a and 211a. This arrangement is such that the orientation of passages 210a and that of slots 210 is the same, and so is the direction of passages 211a and slots 211 the same. In other words the passage 210a and the openings 210 in the cylinder above and below the planes of plates 203 are oriented in one direction, and those of the cylinder and the vanes below and above the planes of plates 204 are in the opposite direction. This is clearly shown in FIGS. 12 to 15.

In the arrangement of FIGS. 11 to 15, the descending medium, which is for instance forced through plates 203, will flow through passages 210a of the vane arrangement 220b from the inside out, thereby acquiring a rotation. The ascending medium which is forced through the same plates 203 flows through slots 210 of cylinders 202a outwardly, obtains a rotation in the same direction and thereby adds to the rotation of the descending medium.

The same additive rotational effects are produced at plates 204 and vane arrangements 220a and cylinder 202b whereat the media stream from the outside toward the interior. But since the orientation of the slots and the passages is opposite to that of the vane arrangement 220b and cylinders 202a, there will be a rotation of the medium in the same sense as above described for the outward flow of media. It is clear that in this case the media will rotate in all zones in the same sense as indicated by arrows 217 in FIGS. 12 to 15, and the rotation will be effected by utilization of the kinetic energy of the lighter as well as the heavier medium.

Thus in FIGS. 11 to 15 the lighter and the heavier media are forced to rotate in the same direction and in all zones the rotations of the media are additive. The cylinder sections 202a and 202b may be formed of expanded metal having a large number of small slots. In some instances the passages 210a and 211a may be provided by expanded metal cylinders similar to 202a and 202b, instead of the vanes 220a and 220b.

Figure 16:
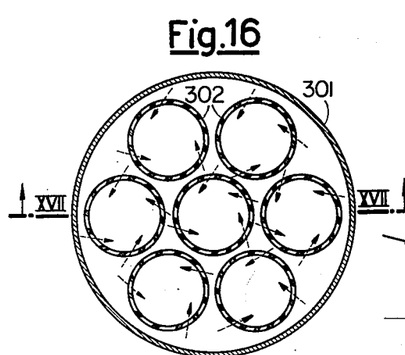
FIGS. 16 and 17 are transverse and vertical sections, respectively, of an apparatus in which several cylindrical columns are disposed within the housing and constructed in accordance with the present invention.
Figure 17:
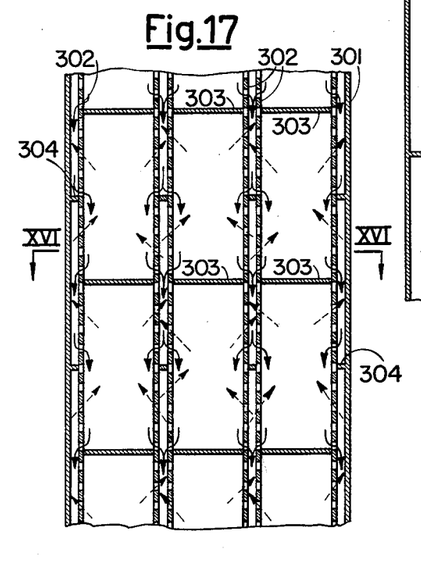

In FIGS. 16 and 17 the further modification is shown in which several columns 302 are disposed in parallel vertical side-by-side relationship, within a hollow vertical cylindrical wall or housing 301. The space within each cylindrical column 302 is subdivided into a number of separate zones by partitions 303. These zones are similar to the inner zones previously described in the other modifications. In accordance with the invention, outer zones are also provided by partitions 304 outside the cylindrical columns and in the spaces between the several columns 302 and between the columns 302 and the housing 301. As in the previous modifications, the outer partitions 304 are offset from the inner partitions 303 thereby providing the same relationship between the inner zones and the outer zones that will control and define the paths of movement of the heavier descending mediums to flow along the paths indicated by the solid arrows, while the rising lighter medium will move along the paths indicated by the dash arrows.

The apertures or slots extending through the walls of the several columns 302 constitute tangential slots, that is, slots tangentially effective, to cause movement of the lighter rising medium in direcions having tangential components in order to impart some rotational movement to the heavier descending medium. Thus, a longer interval of contact is established, with a consequent increase in the desired physical interaction between the two media.

Figure 18:
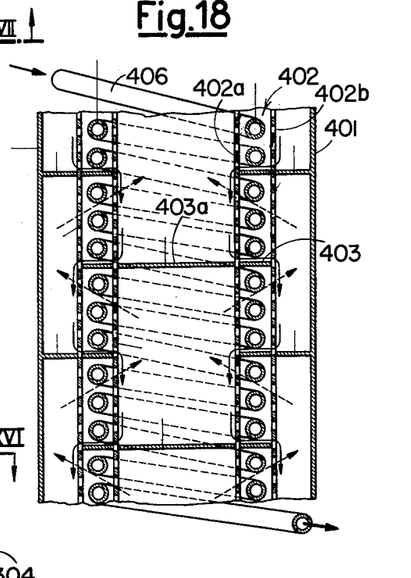
FIG. 18 is a vertical sectional view of a further modification of the invention in which the perforated column is provided as a hollow cylinder with heat exchanger tubes disposed within the space between the two walls of the hollow cylinder, which is otherwise constructed to embody the features previously described in connection with the single wall cylinders.

In FIG. 18 is shown a further modification of a tower, in which the cylindrical column 402 is a hollow structure having two walls 402a and 402b, with a structural arrangement providing for internal annular partitions 403 to subdivide the space within the cylinder 402 into internal or inner zones in order to provide the constructional feature as indicated in the other modifications. An inner circular disc partition 403a is provided at the same level as the internal annular partitions 403 between the two walls of the cylinder 402.

In similar manner external annular partitions 404 are disposed between a housing 401 and the outer wall 402b of the cylinder at the same levels as the internal partitions 403b within the walls of the cylinder.

Between the two walls of the cylinder 402 are suitably arranged heat exchanger tubes or piping 406 to conduct a heating or cooling fluid for controlling and regulating the ambient temperature at which the mixing or scrubbing action or the like may be taking place. Thus, heating control may be introduced where elevated temperature of operation is desired to compensate for any heat that is lost by radiation. Similarly, heat may be removed where the operation may be desired at a temperature below the resulting temperature caused by frictional heat developed by the operation.

Many other modifications and variations of my invention may be made without departing from the spirit and pirnciple thereof as defined in the following claims.

What is claimed is:

1. In a rectifying or contacting column for a downwardly flowing relatively heavier fluid and an upwardly flowing lighter fluid, the combination of: a vertical housing, at least one vertical hollow cylinder within said housing, the wall of said cylinder being spaced from the wall of said housing, a plurality of first partitions spaced from each other and arranged at predetermined levels in the space outside said cylinder so as to divide said space into a plurality of outer zones separated from each other by said first partitions and arranged one above the other, and a plurality of second partitions being spaced from each other and each being arranged at a level between the levels of two successive first partitions so as to form a plurality of inner zones separated from each other by said second partitions and arranged within said cylinder in offset relation to said outer zones, said wall of said cylinder being provided with perforations whereby the upper portion of an inner zone communicates with the lower portion of a first outer zone and the lower portion of the same inner zone communicates with the upper portion of a second outer zone below said first mentioned outer zone, said cylinder wall having an appreciable thickness and all portions of said cylinder wall having a single inner radius and a single outer radius, said perforations being in the shape of slots through the cylinder wall oriented in a tangential direction, and means including said partitions for producing countercurrent flow of said two fluids through said cylinder wall throughout all said portions thereof.

2. A device as claimed in claim 1, characterized in that there are provided a number of hollow cylinders side by side in said housing with spaced partitions in each hollow cylinder to form inner zones, and spaced partitions outside the cylinders to provide outer zones offset from the inner zones.

3. A device as claimed in claim 1, including means for rotating the hollow cylinder in order to improve mixing.

4. A device as claimed in claim 1, characterized in that the cylinder is hollow with a double wall, and heat exchanging pipes are disposed within such double wall of said cylinder.

5. In a rectifying or contacting column as claimed in claim 1, a first annular element in each outer zone, a second annular element in each inner zone, said annular elements being spaced from said cylinder, said first annular elements extending along the outside of said cylinder opposite to said upper portion of the inner zone, said second annular elements extending along the inside of said cylinder in the range of said lower portion of the inner zone, said perforations of the wall of the cylinder being oriented in a first tangential direction, and said annular elements having apertures oriented in a second tangential direction opposite to the tangential direction of the slots of the adjacent portion of the wall of the cylinder.

6. In a rectifying or contacting column as claimed in claim 1, a first annular element in each outer zone, a second annular element in each inner zone, said annular elements being spaced from said cylinder, said first annular elements extending along the outside of said cylinder opposite to said upper portion of the inner zone, said second annular elements extending along the inside of said cylinder in the range of said lower portion of the inner zone, said perforations of the wall of the cylinder being oriented in a first tangential direction, said annular elements having apertures oriented in a second tangential direction opposite to the tangential direction of the slots of the adjacent portion of the wall of the cylinder, and said slots being uniformly oriented in the same tangential direction throughout the entire length of the wall of said cylinder.

7. In a rectifying or contacting column as claimed in claim 1, a first annular element in each outer zone, a second annular element in each inner zone, said annular elements being spaced from said cylinder, said first annular elements extending along the outside of said cylinder opposite to said upper portion of the inner zone, said second annular elements extending along the inside of said cylinder in the range of said lower portion of the inner zone, said perforations of the wall of the cylinder being oriented in a first tangential direction, said annular elements having apertures oriented in a second tangential direction opposite to the tangential direction of the slots of the adjacent portion of the wall of the cylinder, said slots being oriented in one direction in that portion of the wall of the cylinder defining said upper portion of each inner zone.

8. In a rectifying or contacting column for a downwardly flowing relatively heavy fluid and upwardly flowing lighter fluid, the combination of: a vertical housing, a plurality of vertical hollow pervious sections within said housing having cylindrical walls spaced from the wall of said housing, a plurality of first partitions spaced from each other and arranged at predetermined levels in the space outside said sections so as to divide said space into a plurality of outer zones separated from each other by said first partitions and arranged one above the other, and a plurality of second partitions within said sections and each being at a level between the levels of two successive first partitions so as to form a plurality of inner zones separated from each other by said second partitions and arranged within said sections in offset relation to said outer zones, whereby the upper portion of an inner zone communicates through a pervious section with the lower portion of an outer zone and the lower portion of the same inner zone communicates with the upper portion of a second outer zone below said first-mentioned outer zone, and means for joining said first and second partitions to said vertical hollow sections for substantially completely separating the portions of said sections through which said two fluids flow in the same radial directions, whereby only countercurrent flow of said two fluids through each portion of said sections is produced, said cylindrical walls having an appreciable thickness and all portions of said walls having a single inner radius and a single outer radius, said walls having perforations therethrough in the shape of slots oriented in a tangential direction.

9. In a rectifying or contacting column as claimed in claim 8, a first annular element in each outer zone closely spaced about and surrounding one of said vertical hollow sections opposite to an upper portion of an inner zone, second elements extending along the inside of said sections in the range of the lower portions of the inner zones, the wells of said sections having said slots oriented in a first tangential direction and said elements having apertures oriented in a second tangential direction.

10. In a rectifying or contacting column for a downwardly flowing relatively heavy fluid and upwardly flowing lighter fluid, the combination of: a vertical housing, a plurality of vertical hollow pervious sections within said housing having cylindrical walls spaced from the wall of said housing, a plurality of first partitions spaced from each other and arranged at predetermined levels in the space outside said sections so as to divide said space into a plurality of outer zones separated from each other by said first partitions and arranged one above the other, and a plurality of second partitions within said sections and each being at a level between the levels of two successive first partitions so as to form a plurality of inner zones separated from each other by said second partitions and arranged within said sections in offset relation to said outer zones, whereby the upper portion of an inner zone communicates through a pervious section with the lower portion of an outer zone and the lower portion of the same inner zone communicates with the upper portion of a second outer zone below said first-mentioned outer zone, and means for joining said first and second portions to said vertical hollow sections for substantially completely separating the portions of said sections through which said two fluids flow in the same radial direction, whereby only counter current flow of said two fluids through each portion of said sections is produced, said cylindrical walls having an appreciable thickness and perforations therethrough in the shape of slots oriented in a tangential direction.

11. Apparatus according to claim 10, wherein said cylindrical walls are foraminous, each having a large number of said slots along the height thereof.

12. Apparatus according to claim 11, wherein each cylindrical wall extends from one partition to a given height above the next upper partition and the portion above said next partition is imperforate and forms a liquid containing tray with said next partition.

13. Apparatus according to claim 12, wherein the lowermost portions of the cylindrical walls have openings for substantially unimpeded flow of the heavy fluid.

14. Apparatus according to claim 11, wherein the lowermost portion of each of said cylindrical walls is mounted on the top of one of said partitions and has slots oriented in a tangential direction opposite to that of the remainder of that cylindrical wall.

15. Apparatus according to claim 14, wherein said lowermost portion comprises a ring of oblique vanes.

16. Apparatus according to claim 15, wherein the upper portions of said cylindrical walls are an expanded metal cylinder.

17. Apparatus according to claim 14, wherein the slots in the upper portions of adjacent cylindrical walls are oriented in opposite tangential directions.

18. Apparatus according to claim 10, wherein at least a portion of each cylindrical wall is an expanded metal cylinder.

References Cited in the file of this patent

UNITED STATES PATENTS

| | | |
|---|---|---|
| 2,051,545 | Collins | Aug. 18, 1936 |
| 2,120,256 | Mensing | June 14, 1938 |
| 2,159,988 | Hasche | May 30, 1939 |
| 2,259,030 | Fisher | Oct. 14, 1941 |
| 2,259,032 | Fisher | Oct. 14, 1941 |
| 2,259,034 | Fisher | Oct. 14, 1941 |
| 2,560,071 | Bloomer | July 10, 1951 |
| 2,615,700 | Dixon | Oct. 28, 1952 |

OTHER REFERENCES

National Carbon Co., Bulletin Form No. CP–8M–7–47, page 11.

UNITED STATES PATENT OFFICE
CERTIFICATE OF CORRECTION

Patent No. 3,028,151

April 3, 1962

Walter Kittel

It is hereby certified that error appears in the above numbered patent requiring correction and that the said Letters Patent should read as corrected below.

Column 7, line 57, for "wells" read -- walls --.

Signed and sealed this 24th day of July 1962.

(SEAL)
Attest:

ERNEST W. SWIDER
Attesting Officer

DAVID L. LADD
Commissioner of Patents